United States Patent [19]

Brewer

[11] 4,401,513
[45] * Aug. 30, 1983

[54] APPARATUS FOR PYROLYZING SHREDDED TIRES

[76] Inventor: John C. Brewer, 2529 Village Cir., Salt Lake City, Utah 84108

[*] Notice: The portion of the term of this patent subsequent to Dec. 28, 1998 has been disclaimed.

[21] Appl. No.: 335,109

[22] Filed: Dec. 28, 1981

Related U.S. Application Data

[63] Continuation of Ser. No. 191,171, Sep. 26, 1980, abandoned.

[51] Int. Cl.³ .................. C10B 1/06; C10B 27/00; C10B 45/00
[52] U.S. Cl. ................. 202/97; 201/25; 202/137; 202/254; 202/266; 585/241
[58] Field of Search ............ 202/97, 98, 137, 266, 202/223, 224, 254, 260; 201/2.5, 25; 585/241

[56] References Cited

U.S. PATENT DOCUMENTS

| | | | |
|---|---|---|---|
| 53,641 | 4/1866 | Mattocks | 202/224 |
| 375,908 | 1/1888 | Wilson | 202/97 |
| 1,490,542 | 4/1924 | Shaw | 202/98 |
| 1,608,210 | 11/1926 | Heitmann | 202/98 |
| 1,911,473 | 5/1933 | Simpson | 202/98 |
| 2,269,025 | 1/1942 | Johansson | 202/98 |
| 2,289,917 | 7/1942 | Lambiotte | 201/43 |
| 2,384,184 | 9/1945 | McKinney | 202/97 |
| 3,098,799 | 7/1963 | Crawford | 202/98 |
| 3,823,224 | 7/1974 | Laman et al. | 201/25 |
| 4,029,550 | 6/1977 | Mitsui et al. | 201/25 |

FOREIGN PATENT DOCUMENTS 587559 4/1925 France ................. 202/97

*Primary Examiner*—Bradley Garris
*Attorney, Agent, or Firm*—Ronald E. Barry

[57] ABSTRACT

A process and apparatus for recovering the material components of rubber tires, the process including the steps of shredding the rubber tires to a size capable of being transported, heating the shredded rubber pieces in an inert atmosphere to a temperature sufficient to vaporize the heat recoverable components of the tires, condensing the vaporizable components to liquify the oil and ammonia present, collecting the uncondensed gas, and recovering the carbon residue and metal remaining after cooling. The apparatus including a hot air oven having a plurality of hot air conduits defining a primary heating zone and a top wall configuration defining a gas collection zone and a tote bin formed by a closed container having an opening at one end and a top wall configuration conforming to the top wall of the oven.

8 Claims, 7 Drawing Figures

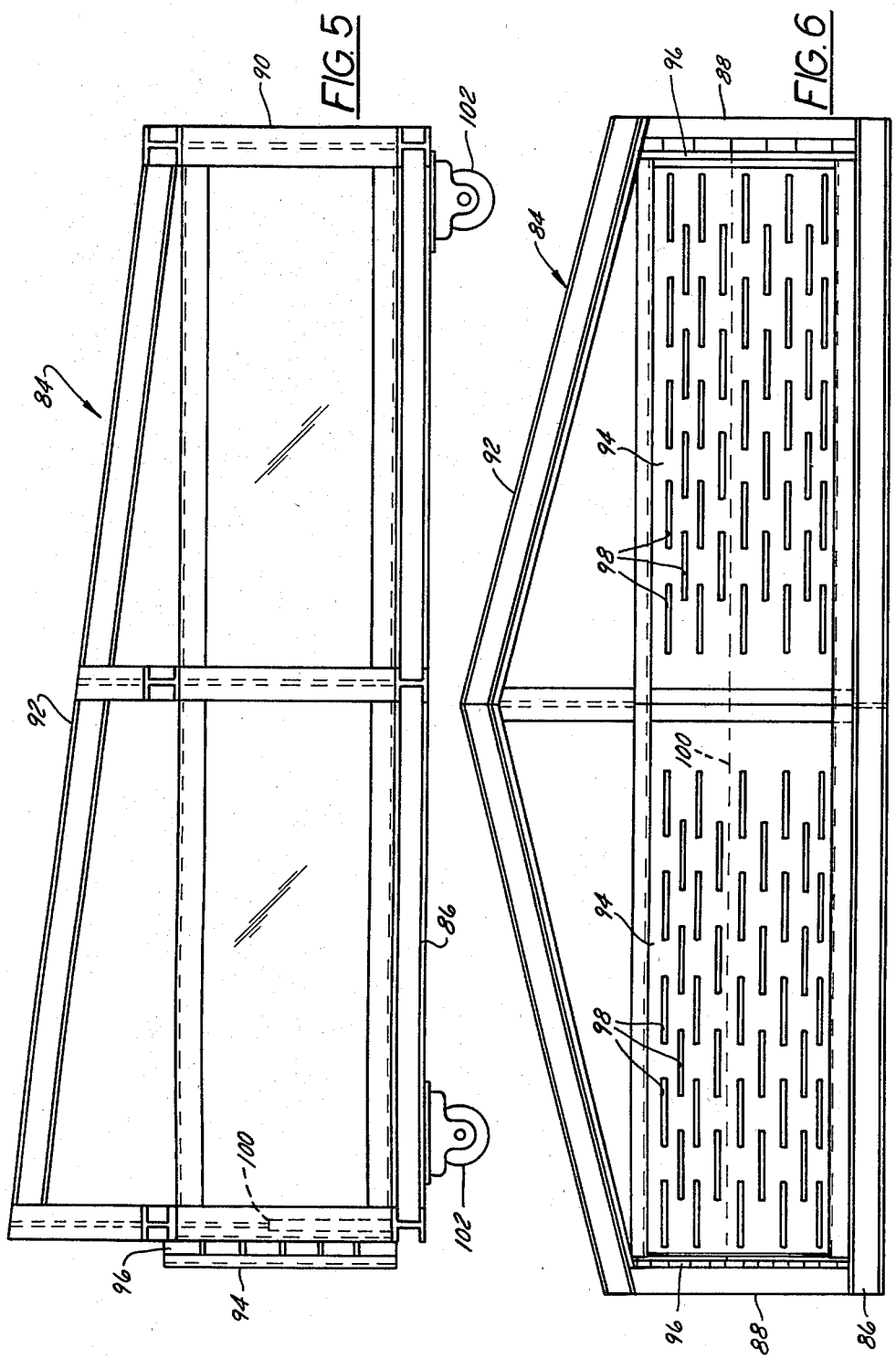

APPARATUS FOR PYROLYZING SHREDDED TIRES

This is a continuation of application Ser. No. 191,171 filed Sept. 26, 1980, now abandoned.

BACKGROUND OF INVENTION

For many years used tires have been literally thrown away. It is now estimated that as many as 150 to 200 million tires are scrapped in the United States each year. A small percentage of these tires have been recycled or reclaimed through retreading processes for further use. However, the vast majority of these tires have not been recycled because of the cost, power, labor, capitol and maintenance required to handle them. The conventional methods of recycling include chemical devulcanization and mechanical grinding. The introduction of steel belted tires to the industry has virtually eliminated the chemical devulcanization and mechanical grinding as a practical means of recycling tires.

A number of freezing processes have been developed to reclaim the wire and rubber from the tires. These systems involve the cyrogenic freezing of the tire to a point of enbrittlement, crushing, separating the magnetic components from the non-magnetic components in the crushed tire and then sizing the rubber that remains. One such process is disclosed in U.S. Pat. No. 4,025,990 issued on May 31, 1977 and entitled Process for Reclaiming Rubber, Metal and Fabric from Whole Tires.

SUMMARY OF INVENTION

The present invention provides for the recovery of the basic components which make up a tire through a unique pyrolysis process. The basic components of a tire which are recoverable with this process include oil and ammonia and the gases methane, butane and propane as well as carbon and steel. The process involves the steps of shredding tires to a predetermined size, filling pyrolytic containers with the shredded tires, placing the pyrolytic container inside a closed oven, purging the oven of oxygen, heating the oven to a temperature sufficient to evaporate the gasous components of a tire, condensing the vapor to liquify the oil and ammonia, and storing the uncondensed gases such as methane, butane and propane. The oven is again purged of gases and the pyrolytic container is then removed from the oven to recover the carbon and steel.

A unique oven has been designed for pyrolyzing the tires. This oven includes a plurality of hot air conduits which encircle the pyrolytic container to provide an even distribution of heat about the container. A novel roof configuration is built into the furnace to create a vapor collection zone where the heated gases from the tires collect.

The containers or bins which are used to transport the shredded tires into the oven are specially designed for compatibility with the oven configuration. In this regard, the containers are completely enclosed on all sides except the front end which is open to allow the gases to escape and provide access to the bin. The top of the container has an inclined configuration which conforms to the configuration of the oven so that gases created within the container will flow toward the gas collection zone provided in the oven. The enclosed portion of the container is immersed in water when removed from the oven to allow for rapid cooling of the carbon to prevent ignition on exposure of the carbon to the atmosphere.

IN THE DRAWINGS

FIG. 5 is a side view in section showing one of the pyrolytic containers.

FIG. 6 is a front end view of the pyrolytic container.

DESCRIPTION

Figure 1:
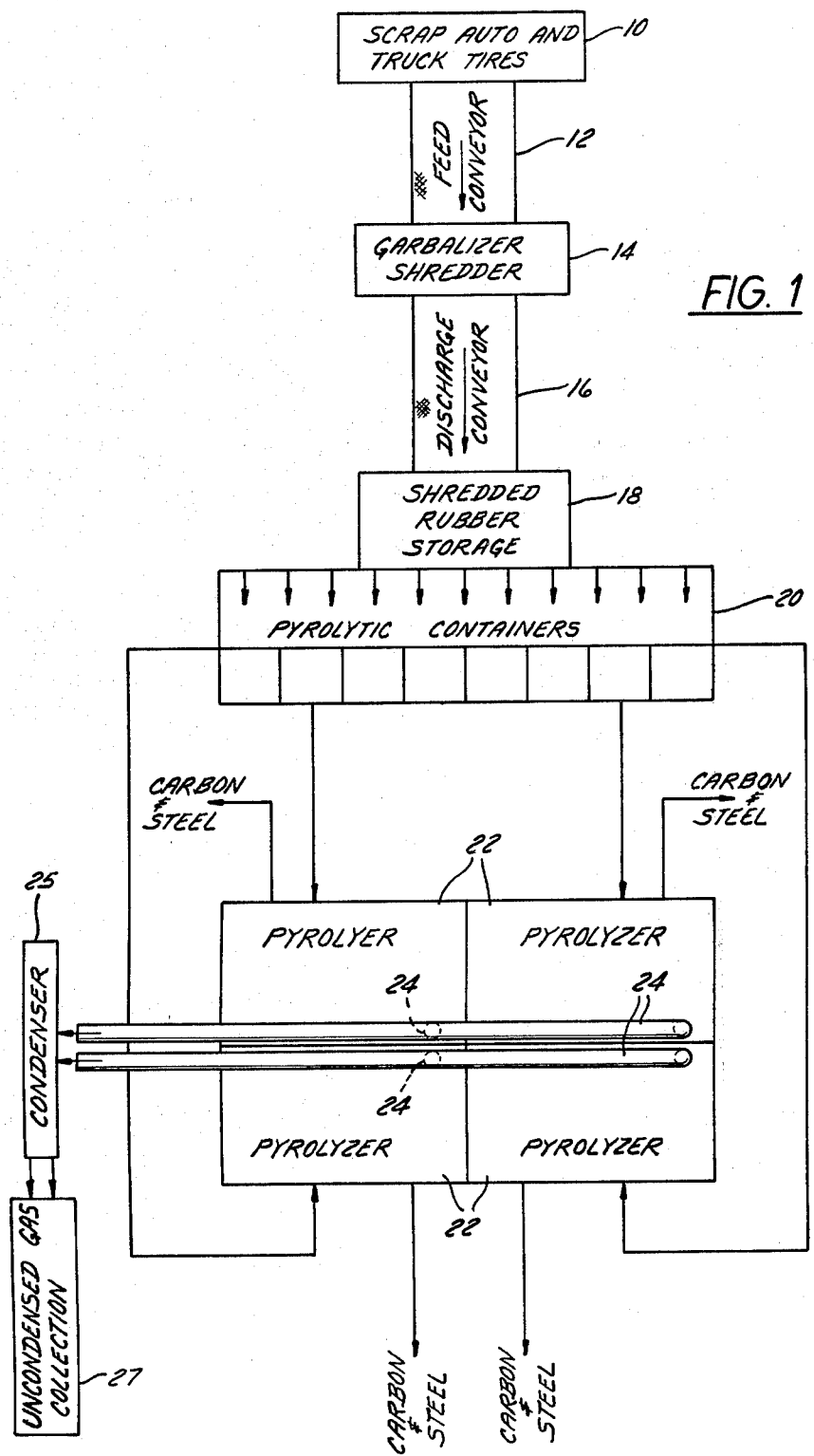
FIG. 1 is a schematic view of the pyrolysis process for recovering the basic components of the tire.

The process for recovering the usable components of shredded tires according to the present invention is generally shown in FIG. 1 of the drawings. The process includes the steps of:

Collecting tires at a station 10;

Feeding the tires by means of a conveyor 12 to a shredder 14. The tires are shredded by means of a shredder of the type shown in my earlier U.S. Letters Patent No. 4,205,799. The shredding step is essential to the success of the system in that the tires must be shredded to a predetermined size, approximately three inches by three inches, which can be reclaimed as described hereinafter:

Feeding the shredded tires by means of a discharge conveyor 16 to a storage area 18:

Conveying the tires by means of pyrolytic containers 20 to a pyrolyzer oven 22.

Purging the oven with inert gases to drive out oxygen:

Raising the temperature of the oven above 700° F. for up to one and one half hours to evaporate the oil, ammonia and gases present in the tires:

Collecting the vapors evaporated from the shredded material in the top of the furnace:

Conducting the vapors by means of pipes 24 to condensers 25 where the oil and ammonia vapors are condensed to remove the oil and ammonia and the uncondensed gases are collected for storage at 27:

Purging the oven of explosive residual gases by admitting inert gases into the oven to prevent explosion and combustion of the carbon residues remaining in the containers:

Removing the pyrolytic containers from the furnaces:

Immersing the containers in water to cool the carbon residues and steel to a temperature below 250° F.:

Crushing the carbon to a powder: and

Removing the steel remaining in the carbon by magnetic means.

Figure 2:
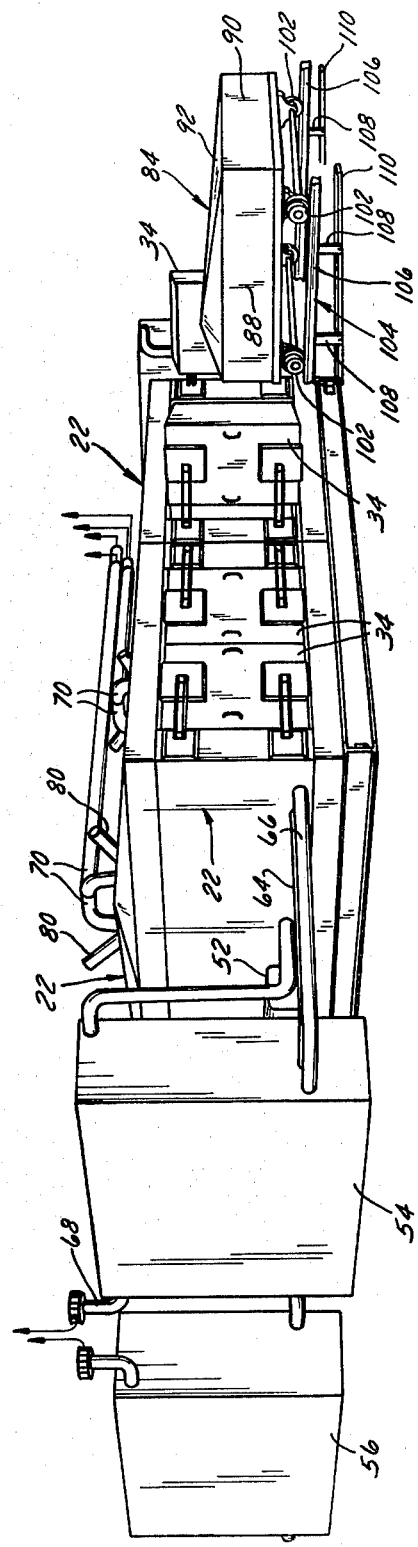
FIG. 2 is a perspective view of the pyrolyzer plant according to the invention.

It should be noted in FIGS. 1 and 2 that a complete system includes four individual ovens 22. This is necessary to obtain sufficient efficiency to operate on a competitive basis as described below. In this regard, it is generally known that a tire weighing an average of 25 pounds contains the following approximate amounts of recoverable materials: 1.8 gallons of fuel oil; 7.8 pounds of carbon; 1.7 pounds of propane methane butane gases; 1 pound of steel and 0.084 gallons of ammonia. Using a system including four furnaces as contemplated herein approximately 3,000 tires can be processed per day. This will produce 5,400 gallons of number 2 fuel oil; 23,400 pounds of carbon; 5,250 pounds of propane, methane, or butane; 3,000 pounds of steel and 250 gallons of ammonia.

THE OVEN

Figure 3:
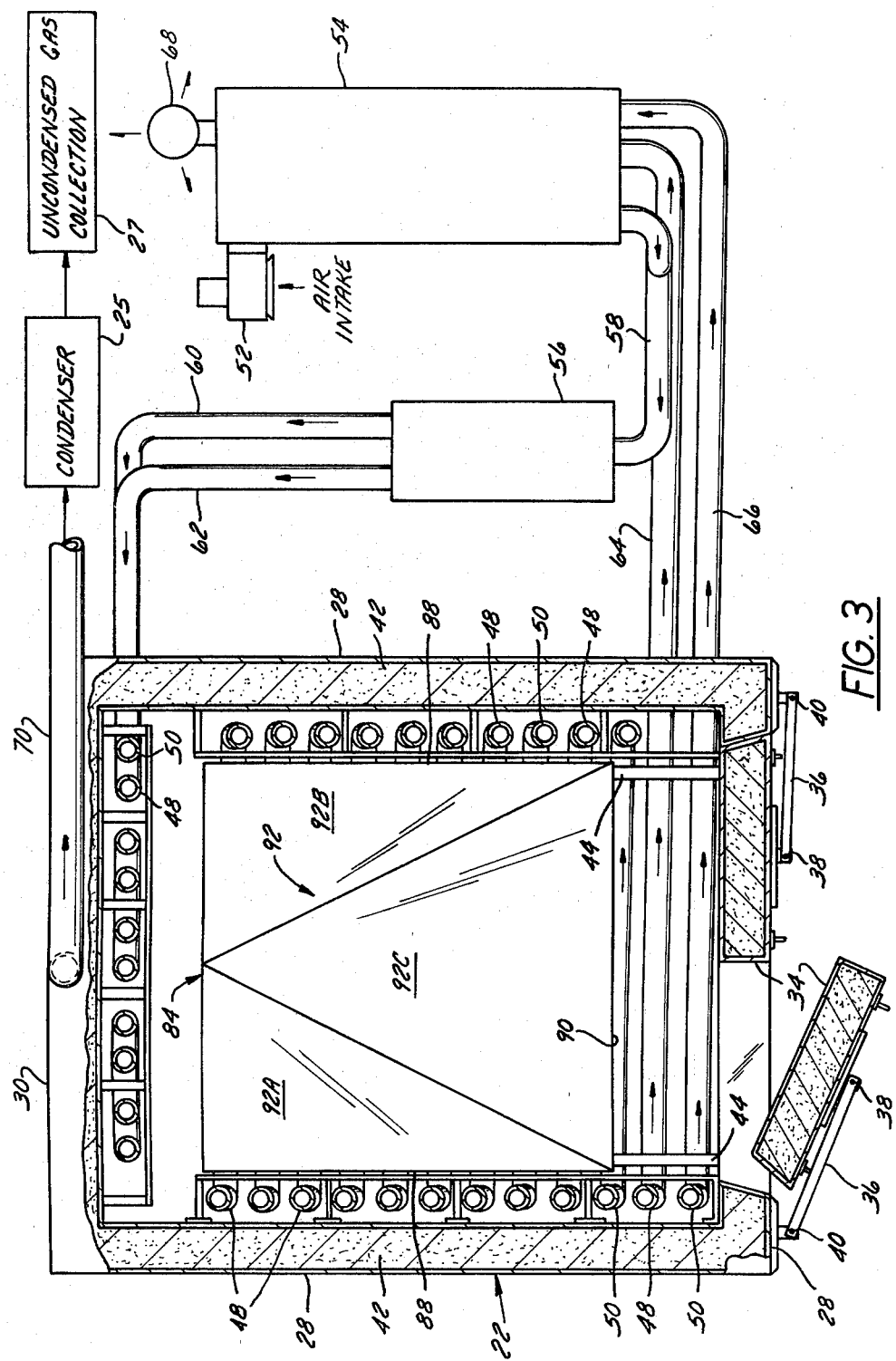
FIG. 3 is a top view of one of the pyrolyzer ovens with a portion of the top removed to show the heating system.
Figure 4:
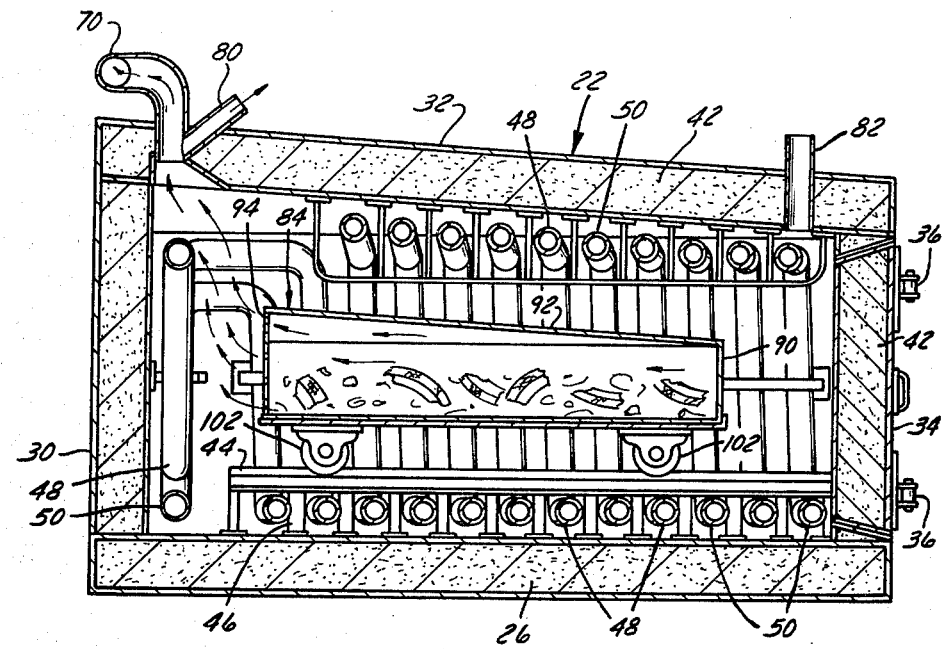
FIG. 4 is a side elevation section view showing one of the pyrolytic containers positioned inside the pyrolyzer oven.

One of the unique features of the process is the configuration of the pyrolyzer oven 22. Each of the ovens 22 is identical in configuration and independently operated as seen in FIG. 3 and 4. Each oven includes a housing having a bottom wall 26, side walls 28, a back wall 30 and a top wall 32 which define a primary heating zone. The front of the housing is open and is closed by means of a pair of doors 34 supported on swing arms 36. The swing arms are pivotally connected to the doors 34 by pins 38 and pivotally connected to the end walls 28 by pins 40. Each of the walls is of conventional oven construction having a insulating medium 42 in each of the walls and doors. The medium is capable of withstanding temperatures up to 1200° F. or more. A pair of tracks 44 are supported in the bottom wall 26 by means of steel I beams 46.

The oven is heated by hot air by means of a plurality of hot air conduits or pipes 48 and 50 which are alternately, spirally supported around the inside surface of the side walls, back wall and bottom wall to completely surround the primary heating zone. The hot air is forced through the conduits by means of a forced draft fan 52 through a heat exchanger 54 and into a combustor 56 through pipes 58. The air is heated to a temperature in excess of 1200° F. in the combustor 56 and is forced into the pipes 48 and 50 through pipes 60 and 62. The air is returned to the heat exchanger from the oven through pipes 64 and 66. Approximately ⅓ of the exhaust air is vented to atmosphere through a vent pipe 68 and the remaining ⅔ is recirculated to the combustor.

The combustor is a conventional gas fired combustor and can be fired either by means of natural gas or by means of the uncondensed gases collected from the condensers 25 as described hereinafter. The heat exchanger is also of a conventional type and can be adjusted to increase or decrease the recirculated air. Heat exchangers of the type commonly referred to as energy wheel, metal surface or heat pipe can be used. A metal surface type distributed by Engineered Products Inc. of Boise, Idaho, is presently being used.

Vapors produced in the pryolyzer oven 22 are directed to an outlet pipe 70 which is connected to one or more condensers 25 to liquify the discharged oil and ammonia vapors. The uncondensed gases, methane, propane, and butane can be collected from subsequent use in firing the combustor 56.

Figure 7:
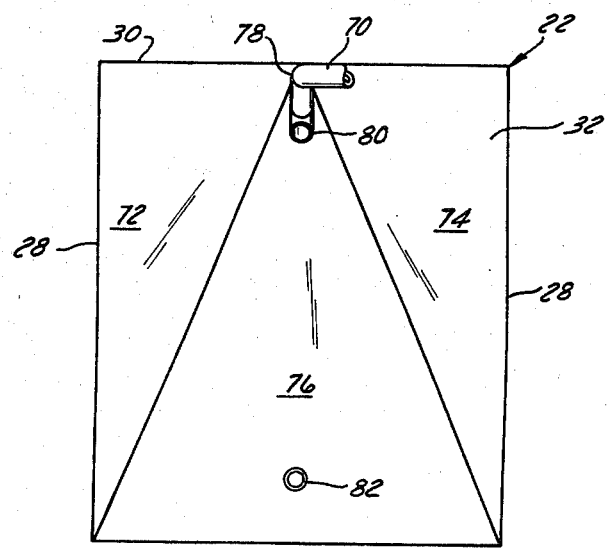
FIG. 7 is a top view of the oven.

Means are provided for directing the vapors in the oven to the outlet pipe 70. Such means is in the form of a tapered or inclined top wall 32. In this regard it should be noted in FIG. 7 that the top wall 32 is formed from three triangular sections 72, 74 and 76. The three sections 72, 74 and 76 are connected to form an apex 78 at the high portion of the oven to form a collection zone at the top of the oven for the vapors and/or gases. The walls 72, 74 and 76 thus form an inclined path of travel for the vapors and gases to the pipe 70.

Means are provided in the top wall 32 of the oven for purging the oven both before the pyrolysis cycle is started and after the pyrolysis cycle has been completed. Such means is in the form of pipes 80 and 82 located at each end of the oven. Inert gases such as carbon dioxide or nitrogen which are both heavier than air, are admitted through pipe 82, and the air present is exhausted through pipe 80. As the inert gases fill the oven, any air remaining in the furnace will be discharged through the pipe 80. Appropriate valves are provided in the pipes 70, 80 and 82 to control the discharge of air and gases from the oven in the proper sequence. The normal sequence for purging is to close the outlet valve pipe 70 and to admit the inert gases through pipe 82 and exhaust any air present through pipe 80. After the air is discharged, the valves in pipes 80 and 82 are closed and the valve in pipe 70 opened. After the pyrolysis process is complete, the valve in pipe 70 is closed and the valve in pipe 80 and 82 are opened. Inert gas is admitted through pipe 82 to exhaust the residual vapors present through pipe 80.

THE TOTE BIN

The shredded rubber is transported to the pyrolyzer oven by means of tote bins or containers 84. Each tote bin as seen in FIGS. 5 and 6 includes a floor or base 86, side walls 88, a rear wall 90 and a top wall 92. The top wall 92 is made up of three sections 92A, 92B and 92C which form an inclined or tapered path of travel for the vapors similar to the top wall 32 of the oven. The sections 92A, 92B and 92C having their apex at the forward end of the container to form an inclined surface for the gases and vapors evaporated from the shredded rubber during the heating process. The front of the tote bin is closed by means of a pair of panels or doors 94 which are pivotally connected to the side walls 88 at 96. The doors are provided with a plurality of openings 98 to allow for the free flow of gases or vapor through the open end of the tote bin. A solid plate 100 extends upward a short distance from the base across the open end of the tote bin to form a wall to prevent liquid rubber from flowing out of the tote bin during the pyrolysis process. The tote bin is moved into and out of the oven on wheels 102 which ride on the tracks 44 located in the oven.

In this regard, it should be noted in FIG. 2 that the tote bin 84 is shown in a position to be moved into one of the ovens 22. The tote bin is supported by means of a collapsible track assembly 104. The track assembly includes a pair of rails 106 which are supported on links 108 that are pivotally connected to the rails 106 and the base 110. When the doors are closed, the rails 106 are moved rearward and pivoted downward on links 108 to clear the space outside the doors. When the doors are open, the rails 106 are moved forward and pivoted upwardly on the links 108 into abutting engagement with the ends of the rails 44 in the oven. The tote bin 84 can then be rolled on the rails 106 and into the oven on rails 44.

Means can be provided for automatically moving the tote bin into the oven. Such means can be in the form of a hydraulic pusher assembly which engages the rear of the tote bin to push it into the oven. The hydraulic assembly can also be used to pull the tote bin from the oven.

OPERATION

In operation and after a tote bin has been filled and placed in the oven, the doors are closed and the oven purged of oxygen by opening exhaust pipe 80 and admitting inert gas into the oven through pipe 82. The pipes 80 and 82 are then closed and the outlet valve in the pipe 70 opened. The vapors created on vaporization of the oil and ammonia, and the gases, propane, methane and butane which are contained in the shredded tire flow out through the tube 70 into the condensers 25. The vapor is condensed in a conventional manner to remove the oil and ammonia and the remaining propane, methane and butane collected for use as a source of fuel for the hot air furnace or collected or stored for later use. The tote bins are designed to carry approximately 2,600 pounds of shredded tires which is a little more than a 100 tires having an approximate weight of 25 pounds.

After the oven has been purged of gases, the doors are opened and the tracks 106 raised into abutting engagement with tracks 44. The tote bins are removed from the oven with the carbon residue and steel remaining in the bins. Since the tires were shredded into strips of approximately three by three inches, the steel strips are small enough to be removable by magnetic means. The carbon residue will be at an elevated temperature and will start to burn or smolder on exposure to air. The bin is cooled immediately by immersion of the bin into water. Since the bin is closed on all sides except the front, the carbon will be cooled without getting wet. After the carbon residue has been cooled, the carbon residue and steel wire are removed from the bin and crushed by means of a pair of roll crushers. The steel strips can then be removed by magnets.

The embodiments of the invention in which an exclusive property or privilege is claimed, are defined as follows:

1. An apparatus for reducing shredded pieces of tires to their basic components, said apparatus comprising in combination an oven, a plurality of hot air conduits within said oven forming a primary heating zone within said oven, means for forcing hot air through said conduits, means at the top of said oven forming a gas collection zone, a gas discharge outlet at the top of said collection zone, a pyrolytic container within said primary heating zone for supporting the shredded pieces of tires, said container having an inclined top wall for directing vapors produced in said container directly into said gas collection zone, and condensing means operatively connected to said gas discharge outlet at the top of said gas collection zone in said oven for condensing the vapors produced on heating said shredded pieces of tires.

2. The apparatus according to claim 1 wherein said conduits are spirally supported in said oven to surround said container.

3. The apparatus according to claim 1 or 2 wherein said hot air forcing means includes a hot air combustor operatively connected to said hot air conduits and a forced draft fan for forcing air through said combustor and into said conduits.

4. The apparatus according to claim 3 including a heat exchanger for selectively recycling predetermined amounts of the hot air discharged from said oven back to said combustor.

5. The apparatus according to claim 1 wherein said means forming a collection zone includes a top wall having an inclined configuration to form the gas collection zone above the primary heating zone of said oven.

6. A hot air pyrolysis oven for removing the heat vaporizable components from shredded pieces of rubber tires, said oven including a housing, a door at one end of said housing, a track within said housing, a closed container having a sloped top wall to direct gases produced in said container to an opening in the top of said container, said container being supported on said track within the housing, a plurality of hot air pipes within said housing forming a primary heating zone around said container, a hot air combustor operatively connected to said pipes, means for forcing air heated in said combustor through said pipes, a gas collection zone formed at the top of said oven an exhaust gas outlet connected to the gas collection zone in said housing, means operatively connecting the exhaust gas outlet to a condenser, an inert gas inlet connected to said housing, means for admitting inert gas into said housing to purge the oven of air prior to heating the oven whereby shredded tires placed in said container will be heated in the absence of oxygen to evaporate the vaporizable components from said shredded tires.

7. The oven according to claim 6 wherein said housing includes a vapor collection zone above said primary heating zone, said collection zone being located in direct communication with said exhaust gas outlet.

8. An apparatus for reducing shredded pieces of tires to their basic components, said apparatus comprising in combination, an oven, a plurality of hot air conduits forming a primary heating zone within said oven, said oven having an inclined top wall forming a gas collection zone at the top of said oven above said primary heating zone, and means connected to said conduits for forcing hot air through said conduits, a pyrolytic container for supporting shredded pieces of tires within said primary heating zone, said container having a top wall having a configuration conforming to the top wall of said oven and an opening at one end of said container top wall for directing vapors produced in said container into said gas collection zone, and condensing means operatively connected to said gas collection zone in said oven for condensing the vapors produced on heating said shredded pieces of tires.

* * * * *